UNITED STATES PATENT OFFICE.

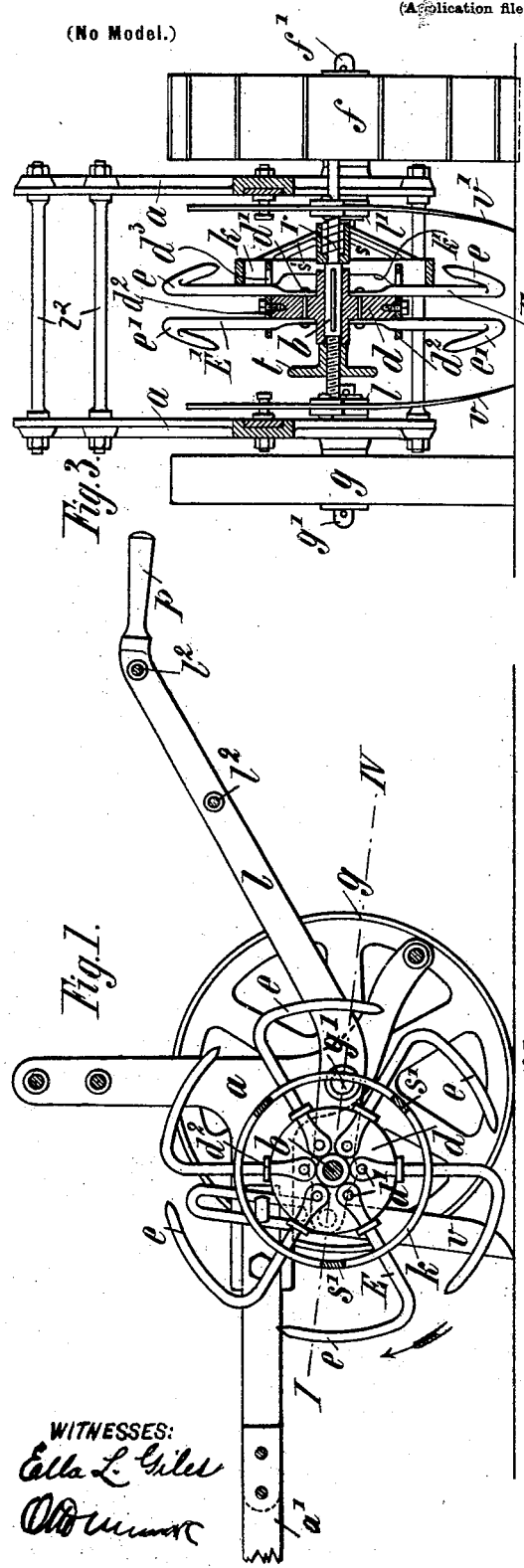

JENS JENSEN, OF KOLDING, DENMARK.

ROOT-DIGGER.

SPECIFICATION forming part of Letters Patent No. 643,797, dated February 20, 1900.

Application filed August 18, 1899. Serial No. 727,696. (No model.)

*To all whom it may concern:*

Be it known that I, JENS JENSEN, a subject of the King of Denmark, and a resident of Kolding, in the Kingdom of Denmark, have invented certain new and useful Improvements in Root-Diggers, of which the following is a specification.

The present invention relates to improvements in root-diggers for pulling up or extracting fusiform roots, as beets, carrots, and the like, and the said improvements refer especially to root-diggers or root-extractors of that class in which a rotating disk is provided with two rows of radial arms, each of which has a slightly-bent prong or jaw. The prongs or jaws of the one row are directly opposite to those of the other row in such a manner that each prong forms part of a wedge-shaped fork, which forks when the said disk of the machine is rotated for digging roots from the rows or hills afford a firm hold on the upper part of the roots, extract the latter, and deposit them on the surface of the ground or in a box of the machine; and the said improvements consist in certain novel features of construction and combinations of parts, as will be hereinafter fully described, with reference to the accompanying sheet of drawings, in which—

Figure 1 is a longitudinal side elevation, partly in section, Fig. 2 a plan, and Fig. 3 a front view, partly in section, of the improved root digging or extracting machine. Fig. 4 is a horizontal section of the machine on the line I IV, Fig. 1.

Similar letters refer to similar parts throughout the several figures.

The root-digger consists of a central disk $d$, provided with two rows of radial arms E E', having hook-shaped and outward-bent prongs or jaws $e$ and $e'$, respectively. The arms and the prongs of the one row are directly opposite to those of the other row. The prongs or jaws opposite each other form, therefore, part of wedge-shaped forks which when the disk $d$ is rotated for digging roots grasp and afford a firm hold on the upper part of the roots, extract the latter, and deposit them on the surface of the ground or in a box of the machine. (Not shown in the drawings.) The arms E and the prongs $e$ on the one hand and the arms E' and the prongs $e'$ form, therefore, sort of coacting catching-hooks. The catching-hooks E' $e'$ are firmly attached to the disk $d$, while the catching-hooks E $e$ are yieldingly supported, so that the latter may move to and from the former during each rotation or revolution of the digging-disk in order to grasp and lay a hold on the roots for extracting the latter and to deposit or let them drop when extracted.

A suitable frame $a$ is carried or supported in well-known manner by suitable wheels $f$ and $g$ and provided at its front part with a shaft $a'$ or any other traction or dragging device. Inside the frame $a$ are mounted, upon the axle-journals $f'$ and $g'$ of the wheels $g$ and $f$, beams $l$ and $l'$, provided with plow-handles $p$ $p'$ and connected and held the proper distance apart by means of cross-bars $l^2$. In the front part of the beams or swinging levers $l$ $l'$ is journaled the shaft $b$ of the disk $d$. The latter carries on one side, as already mentioned above, the catching-hooks E' $e'$, firmly fixed by means of bolts $d'$ and fastening-pieces $d^2$, screwed to the rim of the disk $d$, as will be clearly understood from Figs. 2, 3, and 4. On the other side of the disk $d$ are fixed, also by means of the bolts $d'$, the catching-hooks E $e$; but as the inner or central ends of these catching-hooks are yielding or made in the form of flat springs the said catching-hooks tend to move or swing laterally off from the disk and the fixed catching-hooks, respectively. To enable the lateral motion or swinging of the catching-hooks E $e$, these latter are guided in suitable slots $d^3$ of the pieces or plates $d^2$.

Upon the shaft $b$ is loosely mounted a cup-shaped bush or sleeve $s$, which carries, by means of radial arms $s'$, a ring $k$, having a tapered or sloped portion $k'$. This ring-piece $s$ $s'$ $k$ is under the influence of a spiral spring $r$, which tends to press the ring $k$ against the catching-hooks E $e$. On the other hand, the disk $d$ being movably, but not rotatably, arranged upon the shaft $b$, is held at the proper place by means of a suitable nut $t$, for which a thread is provided on the said shaft $b$, as shown in Figs. 2 to 4. By means of this nut $t$ the pressure with which the catching-hooks E $e$ slide upon the cam-like guiding-surface may be regulated or adjusted at will. A pin $u$, projecting from the beam-lever $l'$ and entering between the radial arms $s'$, prevents the cam-ring $k$ from being rotated by friction when the disk $d$ rotates and the catching-hooks slide along on the cam-surface of the ring $k$.

The shaft $b$ carries a toothed wheel $h$, which engages a toothed wheel $i$, fixed to or made in one piece with the wheel $f$ in such a manner that when the wheel $f$ is moved along over the ground rotation will be imparted also to the shaft $b$ and the disk $d$ and its catching-hooks, respectively.

The machine being driven along over the row of roots, the driver holds the beam-levers $l$ $l'$ at the handles $p$ $p'$ and regulates the position of the beam-levers and the shaft $b$, respectively, in such a manner that the catching-hooks will move along at the proper distance above the ground in order to seize and extract the roots in a reliable manner.

The guide-cam $k$ $k'$ is so formed and arranged that it holds the movable or yielding catching-hooks in an approached position to the fixed catching-hooks (see Fig. 3) during the time the forks, formed by these two rows of catching-hooks, seize or grasp and extract the roots, and the said cam allows a lateral motion of the movable catching-hooks—that is to say, an opening of the said forks holding the extracted roots—when the latter shall be deposited. This opened position of the catching-hooks, as well as the closed position of the same, are clearly shown in Figs. 2 and 4.

The front ends of the beam-levers $l$ $l'$ may be provided with suitable knife-blades $v$ $v'$, adjustable in height and adapted to cut weeds, root-leaves sticking to the ground, and the like.

Having fully described my invention, I declare what I do claim, and desire to secure by Letters Patent, is—

In a machine of the class described the combination with a rotatable disk $d$ provided with a set of fixed catching-hooks $E'$ $e'$ and a set of yielding catching-hooks $E$ $e$ of a cam-shaped guide-ring $k$ $k'$ for the yielding catching-hooks, and of an adjusting-nut $t$, substantially as and for the purpose described.

JENS JENSEN.

Witnesses:
SALLY LEVINSON,
MAX KAEMPFF.